United States Patent [19]

Novy et al.

[11] Patent Number: 4,894,828
[45] Date of Patent: Jan. 16, 1990

[54] MULTIPLE SUP SWAP MECHANISM

[75] Inventors: Robert Novy, Redwood City; Richard Guyon, Mt. View, both of Calif.; Moreno A. Chimenti, Rome, Italy

[73] Assignee: Amdahl Corporation, Sunnyvale, Calif.

[21] Appl. No.: 136,409

[22] Filed: Dec. 22, 1987

[51] Int. Cl.⁴ .............................................. G06F 11/20
[52] U.S. Cl. .................................. 371/11.3; 371/9.1; 364/200
[58] Field of Search .................. 371/7, 8, 9, 11, 12, 371/62, 68; 364/200 MS File, 900 MS File, 184, 187, 132

[56] References Cited

U.S. PATENT DOCUMENTS

| 4,347,564 | 8/1982 | Sugano | 371/9 X |
| 4,437,154 | 3/1984 | Eisele | 371/9 X |
| 4,535,401 | 8/1985 | Penn | 364/132 |
| 4,553,204 | 11/1985 | Hashimoto | 371/12 X |
| 4,610,013 | 9/1986 | Long | 371/9 |
| 4,618,953 | 10/1986 | Daniels | 371/62 X |
| 4,700,292 | 10/1987 | Campanini | 364/187 X |

Primary Examiner—Jerry Smith
Assistant Examiner—Robert W. Beausoliel
Attorney, Agent, or Firm—Fliesler, Dubb, Meyer & Lovejoy

[57] ABSTRACT

In a data processing system having a main processor and a plurality of service processors providing service functions to the main processor, including a first service processor providing primary service functions and a second service processor providing secondary service functions. The main processor performs failure detection on the first processor, and upon the detection of a failure, initiates a switch between the first and the second service processors.

18 Claims, 4 Drawing Sheets

ID  # MULTIPLE SVP SWAP MECHANISM

TECHNICAL FIELD

This invention relates to a data processing system wherein the operation of one or more main processors is controlled and monitored by a plurality of service processors. More specifically, this invention relates to improving the availability of service facilities in a data processing system.

BACKGROUND OF THE INVENTION

Large scale computer systems typically have one or more high performance main processors coupled to a plurality of service processors (SVPs). Basically, the service processors control and monitor the operation of the main processors. However, some service processors are used to provide additional services, such as machine logging, statics gathering for performance evaluation, and system recovery in the event of a failure.

The growing responsibilities assigned to the service processors have caused a concern over both their availability and their reliability. In U.S. Pat. No. 4,455,601, Griscom et al describe a multiprocessor system wherein the service processors are cross-coupled to two main processors. Therein, only one service processor is assigned to actively perform service functions at any one time. The other service processor is dormant and acts as backup to the active processor.

In the Griscom et al system, various aspects of the active processor are continually monitored by its associated maintenance service and support adapter (MSSA). Upon detection of a predetermined set of error conditions, such as stall initial microprogram load (stall IML), the active MSSA will signal, through the other MSSA, the other service processor to start up and take over.

Since the MSSA is not a receiver of service functions provided by a service processor, detection of failures by a MSSA according to Griscom et al is therefore not a true reflection of the availability of services received by the main processors. With the increasing role assigned to the service processors, a more reliable detection scheme is needed.

SUMMARY OF THE INVENTION

In one aspect, the present invention is a method for improving the availability of the service processor facilities in a data processing system having at least one main processor performing system tasks and a plurality of service processors, including a first service processor performing primary service functions to said main processor and a second service processor performing secondary service functions to said main processor. The method comprises the steps of using a main processor to detect for failure indications in said first service processor; and upon detection of a failure indication in said first service processor, transferring said primary service functions from said first service processor to said second service processor.

In another aspect, the present invention is an apparatus for improving the availability of the service processor facilities in a data processing system having at least one main processor performing system tasks and a plurality of service processors, including a first service processor performing primary service functions to said main processor and a second service processor providing secondary service functions to said main processor.

The apparatus comprises: means in said main processor for detecting failure indications in said first service processor; and means responsive to a failure indication in said first service processor for transferring said primary service functions from said first service processor to said second service processor.

Although not necessary in the general case, upon transferring the primary service functions to the second service processor, the main processor may then initiate a reset to the first service processor and transfer the secondary service functions to the first service processor.

DETAILED DESCRIPTION

Figure 1:
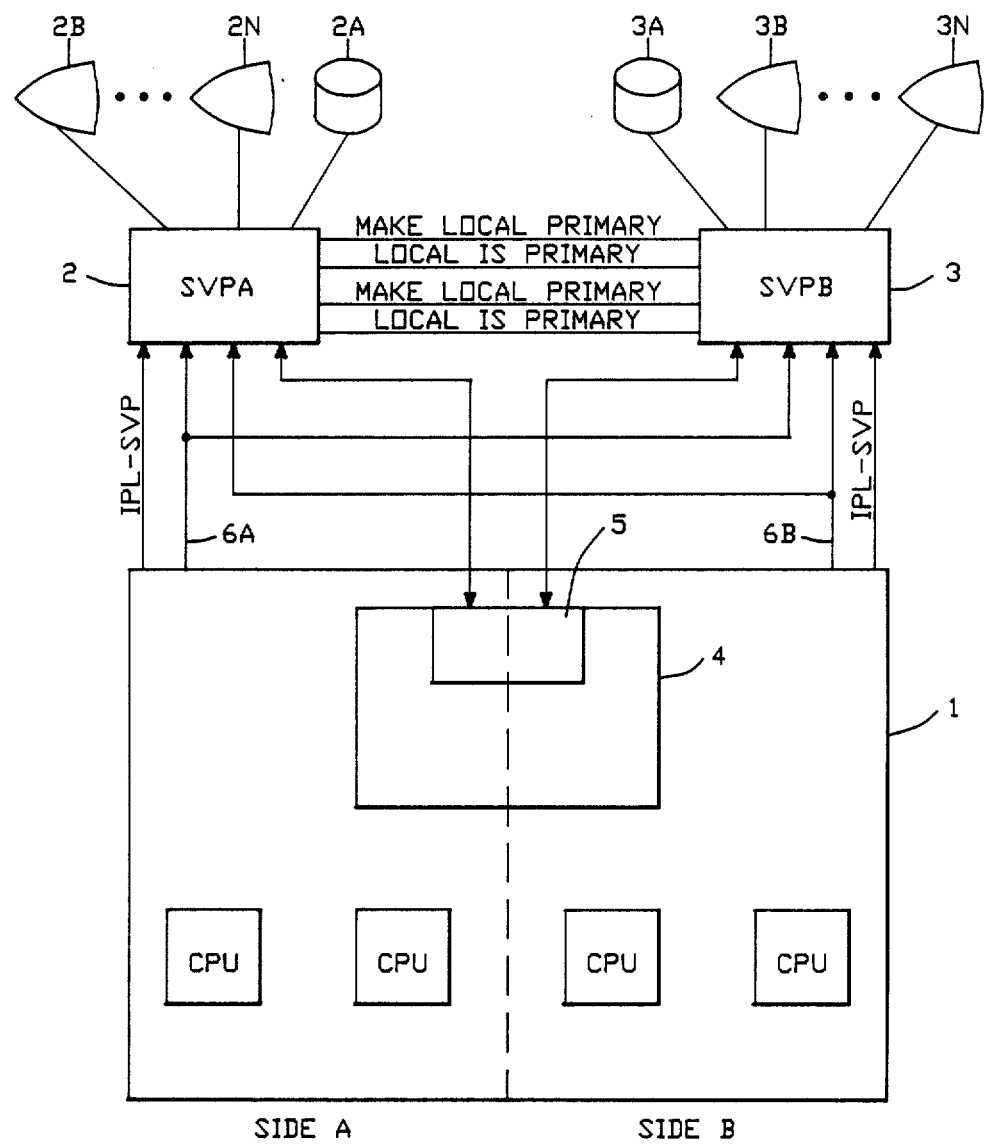
FIG. 1 is a block diagram of the data processing system embodying the present invention.

Referring to FIG. 1, there is shown a mainframe multiprocessor system 1 comprising two otherwise independent systems, designated as side A and side B, coupled together to improve processing capability. Each side includes one or more main central processing units (CPUs) sharing a memory storage unit. According to the preferred embodiment of this invention, the CPUs execute instructions defined by the IBM System/370 Extended Architecture, described in IBM Publication Number SA22-7085-1, entitled "IBM System/370 Extended Architecture, Principles of Operation".

When combined, the memory storage units of sides A and B are concatenated into a logical memory module 4, hereinafter called the mainstore, accessible to the CPUs on both sides of the mainframe 1.

Associated with side A of the mainframe 1 is a service processor SVPA, 2. Similarly, associated with side B is another service processor SVPB, 3. Each service processor controls and monitors the operation of its corresponding side when operating as an independent system, but are cross coupled to both two sides when combined. Each service processor is capable of performing automatic initial program load to reset itself and each has its own internal memory. However, each service processor can access data in the mainstore 4.

Associated with each service processor is a disk storage device, 2a and 3a respectively, and a plurality of consoles, 2b... 2n, 3b... 3n. Information stored in disk storage units 2a and 3a includes system control information used by the mainframe during its operation. Thus, the mainframe 1 may from time to time make file requests to a service processor to access data in the disks.

The consoles are used by the mainframe to input and output system related information (i.e. they may operate as system consoles). Therefore, mainframe 1 may from time to time make console requests to a service processor.

According to the preferred embodiment of the present invention, a subset of the IBM System/370 Signal Processor (SIGP) operations are also delegated to the service processors. Thus the mainframe system may, from time to time, make SIGP requests to a service processor.

Communication between the mainframe system 1 and the service processors is performed by way of messages deposited in a communication area 5 of the mainstore 4, as well as a plurality of interrupt signal lines 6a, 6b, from sides A and B to SVPA and SVPB. These signal lines are cross-coupled, as shown in FIG. 1, so that each can be received by both service processors. Moreover, there is a control signal, IPL-SVP, from each side of the mainframe to the corresponding service processor whereby the mainframe can signal the service processor to perform an IPL.

When a CPU in the mainframe system deposits a message in the communication area 5, it concurrently generates an interrupt signal to the service processors. Since the interrupt signal is cross-coupled, a message deposited by either side of the mainframe 1 will cause an interrupt to both service processors.

At any one time, one service processor is assigned to perform primary service functions which, according to this embodiment of the invention, comprise processing file requests and SIGP requests from both sides of the mainframe. The service processor assigned to perform the primary services is called the primary service processor. The other service processor is called the secondary service processor.

In this preferred embodiment, the secondary service processor, along with the primary service processor, perform secondary service functions which include processing console requests. In other embodiments, however, the secondary processor may only perform monitoring the primary service procesor or the mainframe for a signal to switch primary and secondary service processors assignment.

To prevent both service processors from becoming primary service processors simultaneously, each service processor has a LOCAL-IS-PRIMARY signal to the other service processor. The first service processor that becomes the primary service processor will send this signal to the other service processor to prevent it from assuming the role of a primary. A service processor can also request the existing primary service processor to relinquish its role by sending a MAKE-LOCAL-PRIMARY signal.

In determining the availability of the service processors, the mainframe tracks the processing of service requests by the service processors. The processing of file requests is described herein as illustration of the tracking operation.

Figure 2:
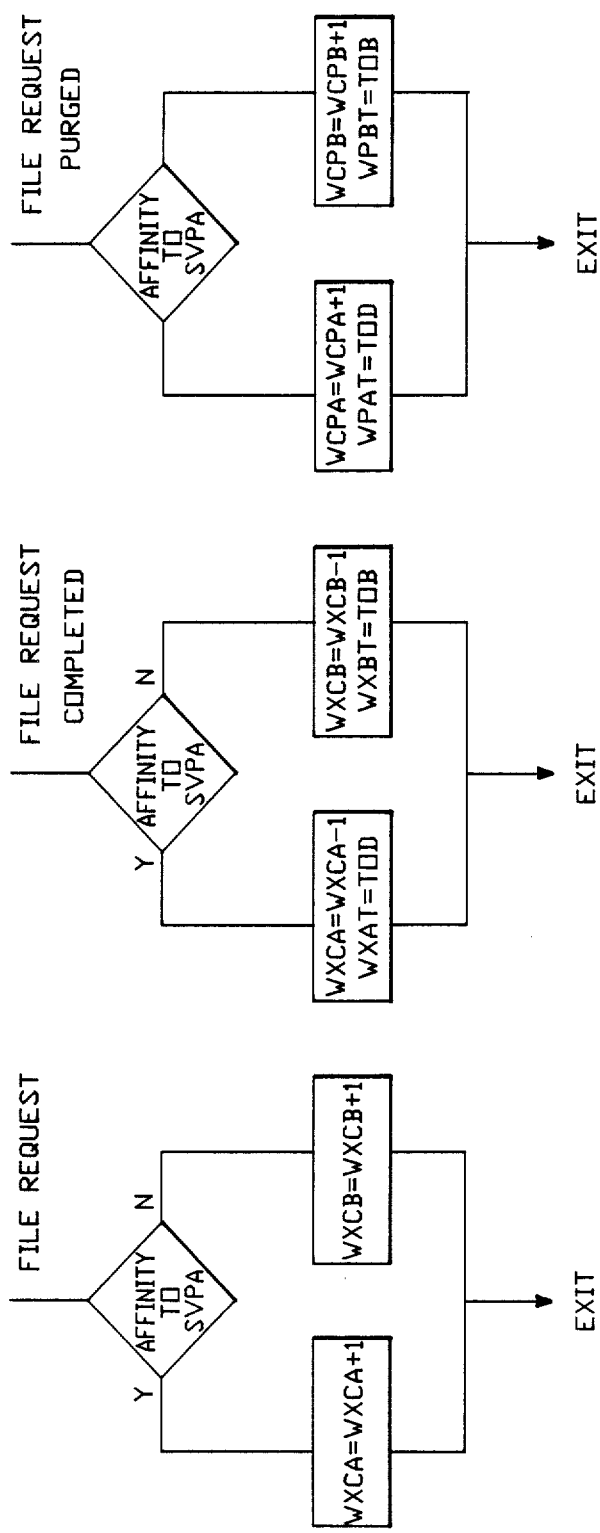
FIGS. 2a-2b are flow charts illustrating the steps whereby the system monitors service operations of the primary service processor.

With reference to the flow charts of FIGS. 2a and 2b, two counters, WCXA and WCXB, are provided in the mainframe 1 to track the number of outstanding file requests made to each service processor. When a file request is made to a service processor, the corresponding counter will be incremented. When a file request is completed by a service processor, the corresponding counter will be decremented.

Two counters, WXAT and WXBT, are provided in the mainframe 1 to register the time at which a file request is processed by each service processor. When a file request is completed by a service processor, the time of completion (such as the Time Of Day clock, TOD) will be registered in the corresponding counter.

With reference to FIG. 2c, when a CPU initiates a service request, it checks after a predetermined time period to see whether the request has completed. If not completed within this time period, the request will be purged. Two counters, WCPA and WCPB, are provided in the mainframe to track the number of file requests each service processor has failed to complete. Moreover, two counters, WPAT and WPBT, are provided to register the time that a file request to a service processor was purged. When a file request to a service processor is purged by the mainframe, the time of the purge will be loaded into the corresponding counter.

It will be understood that the above described tracking operation on file requests is similarly performed on other serviced requests (e.g. console requests).

From time to time, when access to a console fails, the mainframe would try to access another console. If access to all the consoles fails, a NCS flag will be set to indicate a no console condition.

According to the IBM System/370 Extended Architecture, whenever a problem arises in a service processor, the system will receive a "service processor damaged" indication. Upon receiving this indication, the multiprocessor system will set a service processor stall detected (STD) flag and a service processor damage detected (SPD) flag. The time of receipt of this indication is recorded by the mainframe in two registers, STDT and SPDT.

Figure 3:
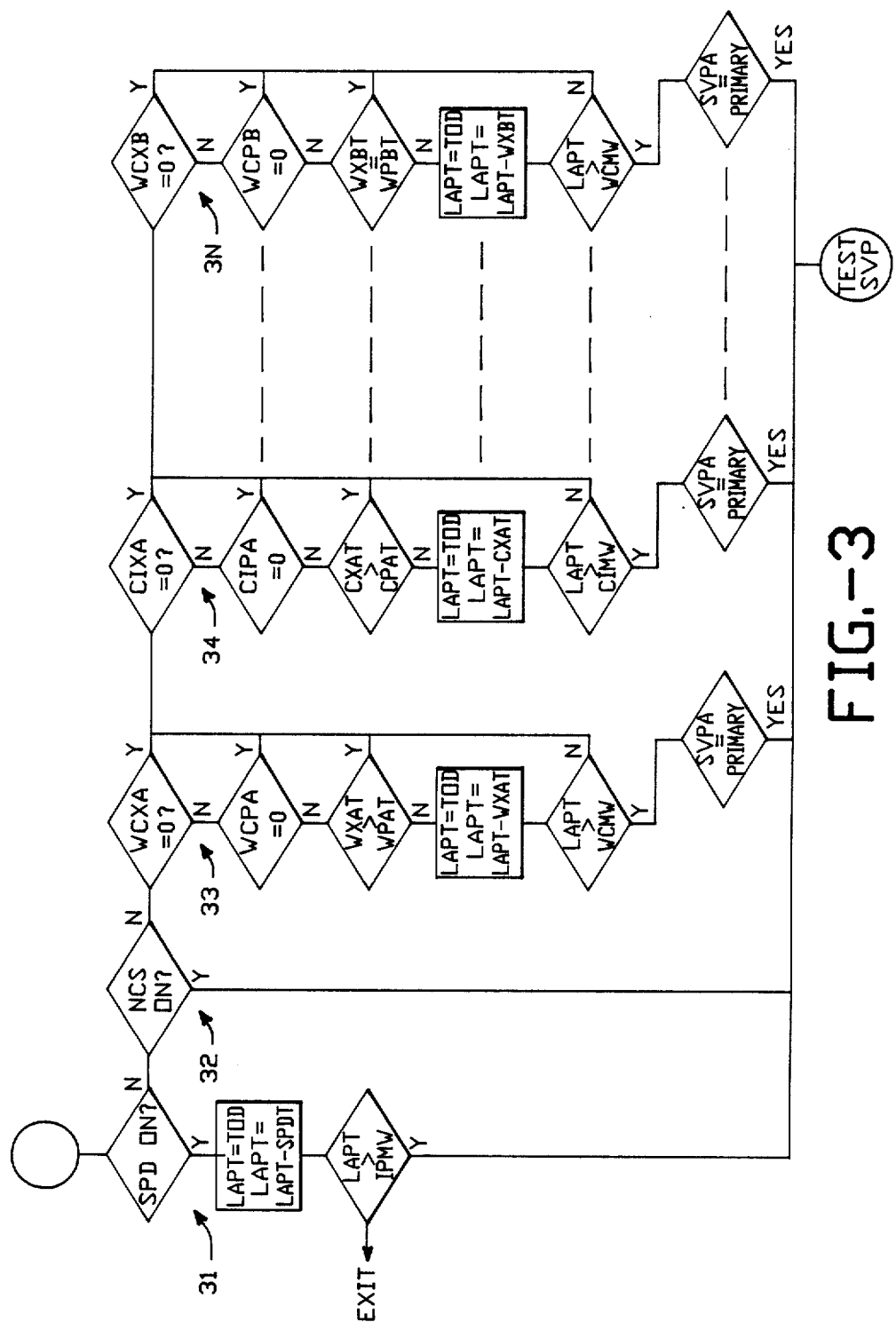
FIG. 3 is a flow chart illustrating the steps whereby failures in the primary service processor are detected.

Referring to FIG. 3, there is shown a flow chart of a routine RSVPROCR executed in the mainframe for detecting a failure in a service processor.

Routine RSVPROCR is executed by the mainframe periodically. In path 31 of RSVPROCR, the mainframe checks whether the service processor stall detected flag STD has been set. If the flag is set, the mainframe checks whether the stall has occurred for more than a predetermined period of time, IPMW. If so, a test service processor operation, TSPO, will be performed.

In path 32, the mainframe checks the NCS flag for a no console condition. If NCS has been set, a test service processor operation TSPO will be performed.

In path 33, the mainframe checks whether a service processor has failed to complete a file request for an amount of time longer than a predetermined time period (MCMW). The mainframe first checks whether there is an outstanding file request to the service processor (WCXA≠0). If so, the mainframe checks whether any request has been purged. This is performed by checking whether WCPA is greaer than zero and whether the most recent status of the service processor is a purge (WPAT greater than WXAT).

The above two steps indicate that the most recent status of the service processor is that a purge operation is performed on it. This is an indication that the service processor is not functional. The mainframe therefore checks how long has it been since the last time a service request was completed, by subtracting WXAT from the current time (TOD). If this period is greater than the predetermined time limit MCMW, the system assumes that the service processor is not functional. If the non-functioning service processor is the primary service processor, the mainframe will initiate a test service processor operation.

Similar steps are also performed on console requests, (path 34), and other types of requests. Moreover, similar steps are performed on the other service processor (path 3N).

Figure 4:
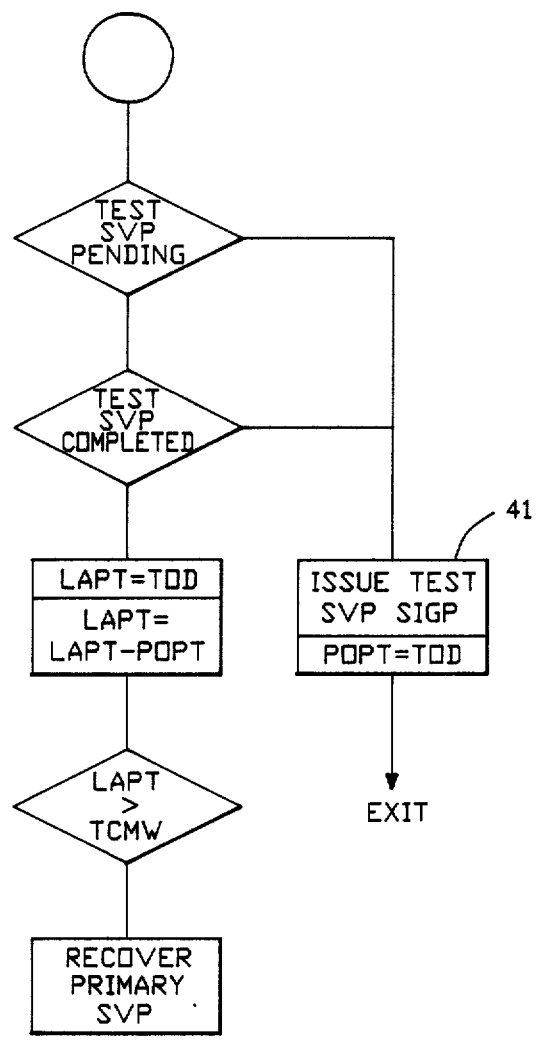
FIG. 4 is a flow chart illustrating the steps for further detecting failures in the primary service processor.

FIG. 4 is a flow chart illustrating a routine whereby failures in the primary service processor are further detected.

Periodically, the mainframe issues a Test Console request to a service processor to inquire its operability.

Under normal operating condition, the service processor will respond by depositing a message in the communication area 5. If the response is received, the mainframe will register the time of the test in counter POPT.

When a test service processor operation TSPO is required, the mainframe checks the time when the last response was made by the service processor to a Test Console request. If the last response was made before a predetermined time limit, TCMW, the system will initiate a switch of the primary/secondary service processors assignment.

The protocol for preforming the assignment switch (in this example from A to B) according to the preferred embodiment is shown in the following table:

| PRISVP | SVPREQ | SECCHK | CPUREQ | Multiprocessor system request to change Primary |
|--------|--------|--------|--------|------------------------------------------------|
| A      | 0      | 0      | 0      | normal operation                               |
| A      | 0      | 0      | F      | CPU checks if secondary is alive               |
| A      | 0      | F      | F      | secondary responds with echo                   |
| A      | 0      | F      | B      | CPU makes change request                       |
| B      | 0      | F      | B      | new primary acknowledge change                 |
| B      | 0      | B      | B      | new secondary echoes CPU request               |
| B      | 0      | B      | 0      | CPU completes change sequence                  |
| B      | 0      | 0      | 0      | new secondary echoes CPU request (normal operation again) |

A flag, CPUREQ, is provided in the communication area 5 whereby the mainframe signals a request to switch the primary service processor assignment. The flag is set along with an interrupt sent to the service processors.

Normally, upon receiving an interrupt, the primary service processor checks the CPUREQ flag to see whether the mainframe has requested to switch the primary service processor assignment. If a switch request is present, the primary service processor will assume the role of secondary service processor. Otherwise, the primary service processor will inspect the communication area for service requests deposited by the mainframe, and will receive the outstanding ones into its internal memory.

Normally, upon receiving an interrupt, the secondary service processor also checks the CPUREQ flag to see whether a request has been made to switch the primary service processor assignment. If such request has been made, the secondary service processor will set a flag, called a PRISVP flag, to indicate that it is the current primary service processor. Otherwise, the secondary service processor will inspect the communication area for service requests deposited by the mainframe, and will receive the outstanding ones into its internal memory.

When a switch in primary/secondary service processor assignment is requested, the mainframe will stop sending requests to the primary service processor and marks all outstanding file requests invalid. It then sets the CPUREQ flag and interrupts the service processors. The mainframe then waits a predetermined amount of time for the secondary service processor to update the PRISVP flag. When the PRISVP flag is updated, the side associated with the defective service processor will cause the defective service processor to perform a reset and an Initial Program Load (i.e. re-ipl). The mainframe will then reopen the file requests and resumes normal operation.

The foregoing preferred embodiment has been presented for the purposes of illustrating and describing the present invention and is not intended to be exhaustive or to limit the invention to the precise form disclosed. Thus, it should be obvious to those skilled in the art that many modifications and variations are possible without departing from the spirit and scope of the invention.

We claim:

1. In a data processing system having at least one main processor performing system tasks and a plurality of service processors, including a first service processor performing primary service functions and a second service processor performing secondary service functions, a method for providing service facilities from said service processors, comprising the steps of:

using a main processor to detect a failure indication in said first service processor; and upon detection of a failure indication, transferring said primary service functions from said first service processor to said second service processor.

2. A method as in claim 1 wherein said step of using the main processor to detect a failure indication in said first service processor further comprises the step of monitoring time durations of service functions performed by said first service processor and generating said failure indication if at least one service function is not completed within a predetermined time period.

3. A method as in claim 2, further including the step of using the main processor to initiate a reset in said first service processor upon detection of said failure indication.

4. A method as in claim 3, further including the step of transferring said secondary service functions to said first service processor after said reset.

5. A method as in claim 1 wherein said step of using the main processor to detect a failure indication in said first service processor includes the steps of sending an inquiry to said first service processor and generating said failure indication if an acknowledgement thereof is not received by said main processor within a predetermined time period.

6. A method as in claim 5, further including the step of using the main processor to initiate a reset to said first service processor upon detection of said failure indication.

7. A method as in claim 6, further including the step of transferring said secondary service functions to said first service processor after said reset.

8. In a data processing system having at least one main processor performing system tasks and a plurality of service processors, including a first service processor performing primary service functions and a second service processor performing secondary service functions, a method for providing service facilities from said service processors, comprising the steps of:

monitoring in said main processor time durations of service functions performed by said first service processor and generating a failure indication if at least one service of said functions is not completed within a predetermined time period;

sending an inquiry to said first service processor and generating a failure indication if an acknowledgement thereof is not received within a predetermined time period; and upon detection of said failure indication, the steps of:
transferring said primary service functions from said first service processor to said second service processor;
initiating a reset in said first service processor; and
transferring said secondary service functions to said first service processor after said reset.

9. In a data processing system having at least one main processor performing system tasks and a plurality of service processors, including a first service processor performing primary service functions and a second service processor performing secondary service functions, apparatus for providing service facilities from said service processors, comprising:
first means in said main processor for detecting a failure indication in said first service processor; and
second means responsive to said failure indication for transferring said primary service functions from said first service processor to said second service processor.

10. The apparatus as in claim 9 wherein said first means comprises means for monitoring time durations of service functions performed by said first service processor.

11. The apparatus as in claim 10 further including means in said main processor for initiating a reset in said first service processor if at least one service function is not completed by said first service processor within a predetermined time period.

12. The apparatus as in claim 11 further including means in said main processor for transferring said secondary functions to said first service processor after said reset.

13. The apparatus is in claim 9 wherein said first means comprises means for sending an inquiry to said second service processor and means for monitoring for an acknowledgement thereof.

14. The apparatus as in claim 13 further including means in said main processor for initiating a reset in said first service processor if said acknowledgement is not received within a predetermined time period.

15. The apparatus as in claim 14 further including means in said main processor for transferring said secondary functions to said first service processor after said reset.

16. In a data processing system having at least one main processor performing system tasks and a plurality of service processors, including a first service processor performing primary service functions and a second service processor performing secondary service functions, apparatus for providing service facilities from said service processors, comprising:
first means in said main processor for detecting failure indications in said first service processor, comprising:
means for monitoring time durations of service functions performed by said first service processor and for generating a failure indication if at least one service function is not completed within a predetermined time period; and
means for sending an inquiry to said second service processor and means for monitoring for an acknowledgement of said inquiry and for generating a failure indication if said acknowledgement is not received within a predetermined time period;
second means responsive to said failure indication from said first means for transferring said primary service functions from said first service processor to said second service processor;
means for initiating a reset in said first service processor; and
means for transferring said secondary functions to said first service processor after said reset.

17. In a data processing system having a first main processor and a second main processor performing system tasks, a first service processor performing primary service functions and a second service processor performing secondary service functions, a method for improving the availability of service facilities from said service processors, comprising the steps of:
cross-coupling said service processors to said main processors;
assigning a time limit to at least a selected one of said primary service functions;
upon requesting said selected primary service function from said first service processor, generating a first failure indication if a completion response of said selected primary service function is not received within said time limit from said first processor;
periodically polling said first processor for a second response;
generating a second failure indication if a response is not received for said polling;
responsive to one of said first and second failure indications, determining whether said second service processor is operational; and
if said second service processor is operational, the steps of:
transferring said primary service functions to said second service processor;
initiating a reset to said first service processor; and
transferring said secondary service functions to said second service processor.

18. In a data processing system having at least one main processor performing system tasks and a plurality of service processors, including a first service processor performing primary service functions including monitoring of said main processing system and a second service processor performing secondary service functions including monitoring of said first service processor, a method comprising the steps of:
monitoring in said main processor system service functions performed by said first service processor and generating a failure indication if at least one service function is not performed,
transferring said service functions from one of said service processors to another one of said service processors upon detecting said failure indication.

* * * * *